United States Patent [19]
Mattli

[11] 4,079,820
[45] Mar. 21, 1978

[54] FLUID COUPLING WITH ELECTRIC CLUTCH

[76] Inventor: Hanspeter Mattli, Burgdorfstrasse, Grunegg CH-3510 Konolfingen, Bern, Switzerland

[21] Appl. No.: 498,911

[22] Filed: Aug. 20, 1974

[30] Foreign Application Priority Data

Aug. 21, 1973 Switzerland ............ 11918/73

[51] Int. Cl.² ............ F16D 27/10; F16D 47/06
[52] U.S. Cl. ............ 192/3.21; 192/84 C; 192/90
[58] Field of Search ............ 192/3.21, 3.31, 3.2, 192/3.25, 3.26, 3.27, 3.28, 84 C, 90

[56] References Cited

U.S. PATENT DOCUMENTS

| 754,291 | 3/1904 | Eastwood | 192/84 C |
|---|---|---|---|
| 2,302,714 | 11/1942 | Pollard | 192/3.25 |
| 2,375,783 | 5/1945 | Gilfillan | 192/84 C |
| 2,453,811 | 11/1948 | Pennington | 192/3.21 |
| 2,646,864 | 7/1953 | Miller et al. | 192/3.31 |
| 2,777,550 | 1/1957 | Forster | 192/3.27 |
| 2,822,484 | 2/1958 | Winter | 192/3.21 |
| 2,899,036 | 8/1959 | Ryba | 192/84 C |
| 3,912,060 | 10/1975 | Handke | 192/84 C |

FOREIGN PATENT DOCUMENTS

1,015,279  9/1957  Germany ............ 192/3.31

*Primary Examiner*—Benjamin W. Wyche
*Attorney, Agent, or Firm*—Striker, Striker & Stenby

[57] ABSTRACT

A rotary power transmission system comprises a hydrodynamic speed or torque converter or other fluid coupling in combination with a magnetically actuated friction clutch of simplified construction wherein the friction clutch is accommodated inside the housing of the fluid coupling whereas the magnet for actuating the friction clutch is located outside the housing and the magnetic field generated thereby penetrates through the housing.

12 Claims, 5 Drawing Figures

FLUID COUPLING WITH ELECTRIC CLUTCH

BACKGROUND OF THE INVENTION

1. Field of the Invention

The invention relates to a rotary power transmission system of the type combining a hydrodynamic speed or torque converter or other fluid coupling with a modulating function, and an electrically operated friction clutch.

2. Description of the Prior Art

Rotary power transmission systems of the type combining a hydraulic speed or torque converter or other fluid coupling and a hydraulically operated friction clutch are known and built with some degree of commercial success, but have shortcomings on account of the sealing and control problems inherent to the pressure fluid systems and valves which form an essential part of such types of known systems.

The present invention presents a simplified method of controlling such hydraulic speed or torques converters or other types of fluid coupling, reducing their cost of manufacture and eliminating fluid sealing problems.

SUMMARY OF THE INVENTION

Accordingly, the present invention provides, in a rotary power transmission system comprising a hydrodynamic speed or torque converter or fluid coupling and a friction clutch, a novel arrangement of an axially movable armature joined with or forming part of the pressure member of the friction clutch situated within the fluid chamber of the converter or fluid coupling and actuated by a magnetic field of variable intensity generated outside of the fluid chamber through a suitably arranged magnetically permeable conductor or conductors in the housing wall of the fluid chamber.

For example, the magnetic field can be generated by one or more electric solenoids arranged concentrically around the axis of the transmission with a magnetically permeable concentric conductor or conductors for the magnetic flux, being disposed in a radial wall of the housing containing the fluid chamber.

BRIEF DESCRIPTION OF THE DRAWING

The features and advantages of the present invention will become apparent on reference to the accompanying drawings in which.

DETAILED DESCRIPTION OF THE INVENTION

Figure 1:
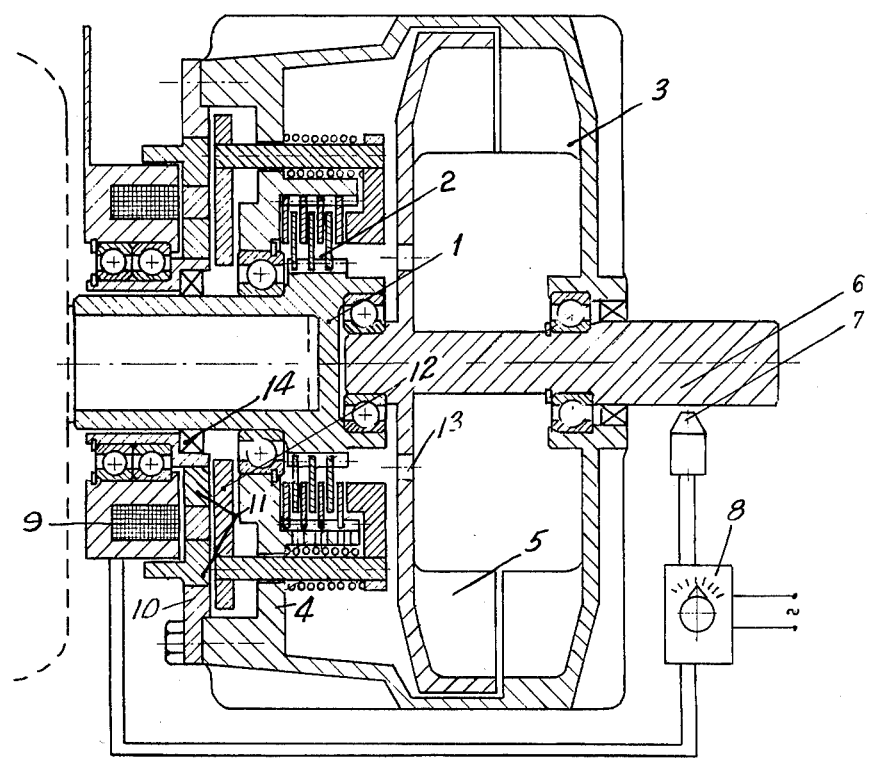
FIG. 1 is an axial sectional view of a power transmission according to a first embodiment of the invention, illustrating schematically a fluid coupling with input and output shafts on opposite sides.

Referring in greater detail to the drawings in which corresponding parts are designated with the same reference numerals and first to FIG. 1 thereof, the power from a source such as an electric motor (not shown), whch may operate at constant speed, is delivered in one of various possible ways, not forming an integral part of the invention, to an input shaft or spider 1 driving through an electromagnetically actuated friction clutch 2 a hydrodynamic pump wheel 3 carrying a driven part 4 of the friction clutch 2, with a variable degree of slip dependent on the intensity of the magnetic field. A hydrodynamically driven turbine wheel 5 is joined with an output shaft 6 from which there is driven an electric tachometer or other speed sensing device 7 acting on a governor 8 influencing the electric excitation of a solenoid coil 9. The magnetic field generated by the excited solenoid coil 9 is conducted through a radial cover wall 10 of the coupling housing by magnetically permeable, but fluid-sealed, concentrically arranged conductors 11 and causes a variable axial force to act on an armature 12 joined with the pressure member of the friction clutch 2, thus varying the speed of rotation of the pump wheel 3 to effect and maintain the desired speed of rotation of the hydrodynamically driven wheel 5. The fluid in the coupling is circulated as a result of the hydrodynamic pressure difference, through apertures 13 towards and past friction clutch 2 with cooling effect on the latter.

The number and texture of the friction surfaces and the disposition of the armature 12 of the friction clutch 2 can be selected to achieve a strong amplifying effect between the electrical excitation of the solenoid and the controlled hydrodynamic output. The electric or other impulse emanating from the output shaft tachometer 7 can be related to the predetermined speed of revolution by the governor 8 and a corresponding electric current fed to the solenoid 9. Hydraulic auxiliaries, such as pumps, servo valves, fluid passages and pipes are eliminated. The number and size of the sealing points 14 are minimized. The governing reaction is essentially dependent on the intensity of the magnetic field and is extremely quick, having practically no inertia caused delay.

Figure 2:
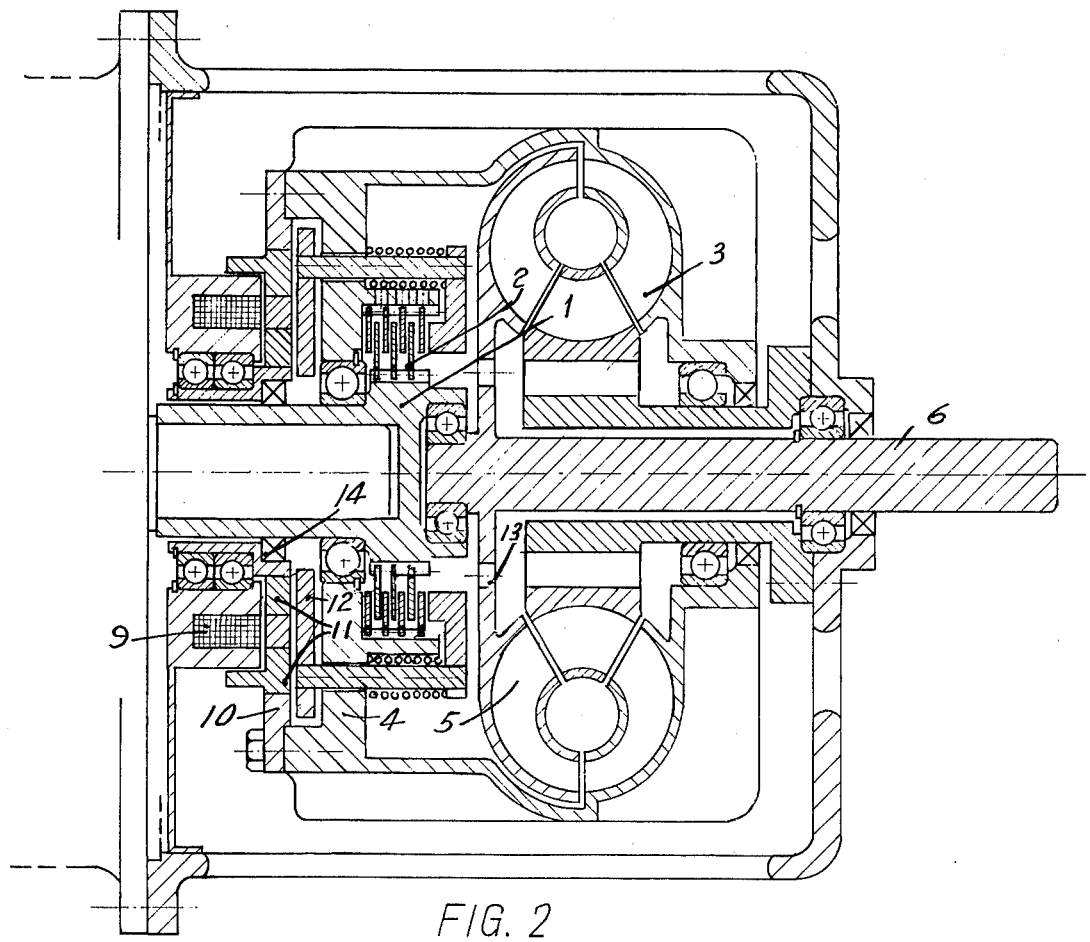
FIG. 2 is an axial sectional view of a power transmission according to a second embodiment of the invention, illustrating schematically a typical hydrodynamic torque converter with input and output shafts on opposite sides.

The embodiment illustrated in FIG. 2 is basically similar to that described above in connection with FIG. 1, except that a hydrodynamic torque converter is used instead of the fluid coupling of FIG. 1. In all other respects, this embodiment corresponds to that discussed previously, so that its construction and function need not be discussed in detail. The hydrodynamic torque converter itself is of a conventional construction.

Figure 3:
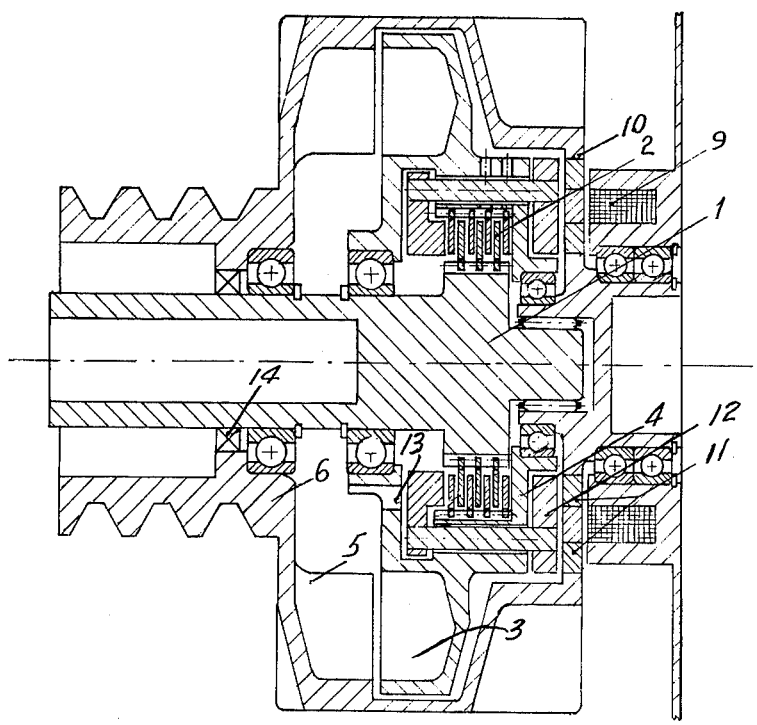
FIG. 3 is an axial sectional view of a power transmission according to a third embodiment of the invention, illustrating schematically a fluid coupling similar to FIG. 1 but with coaxial input and output shafts on the same side.

FIG. 3 illustrates an embodiment basically similar to that discussed above in connection with FIG. 1, except that the input shaft and the output shaft are arranged at the same axial side of the fluid coupling housing. Therefore, corresponding reference numerals have been used here, and in the other embodiments, to designate similar parts having the same function as those discussed in connection with FIG. 1.

Figure 4:
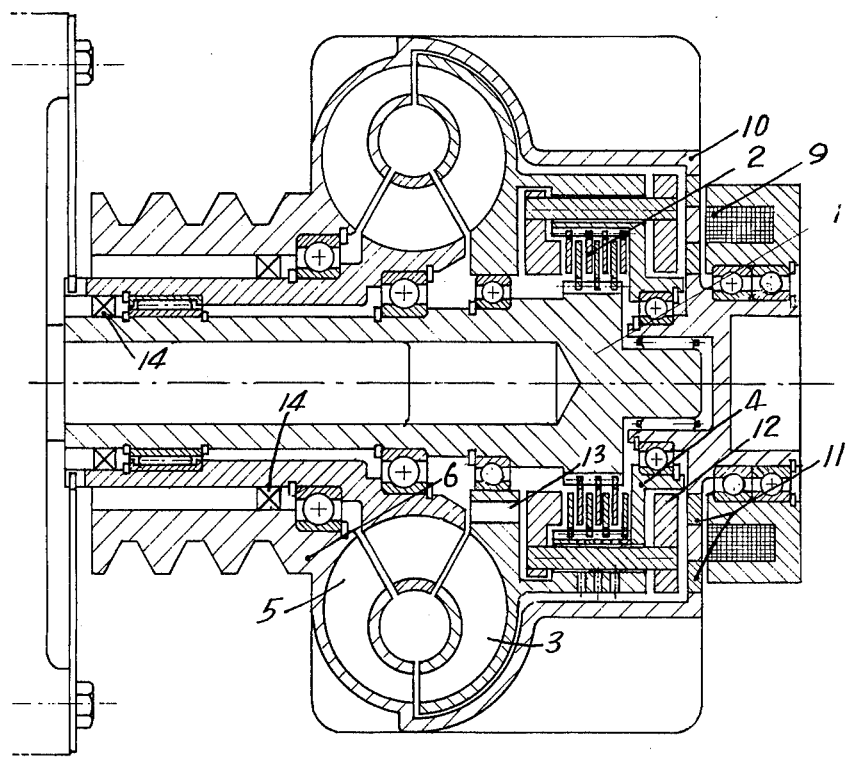
FIG. 4 shows an axial sectional view of a power transmission according to a fourth embodiment of the invention, illustrating schematically a hydrodynamic torque similar to FIG. 2 but with coaxial input and output shafts on the same side.

Another embodiment of the present invention similar to FIG. 2 is illustrated in FIG. 4, with the exception that the input and output shafts of the hydrodynamic torque converter are situated to the same axial side of the housing. Inasmuch as the hydrodynamic torque converter itself is of a known construction and its cooperation with the fricton coupling has been discussed above in connection with FIG. 1 and is apparent from the drawing, no additional explanation is deemed necessary.

Figure 5:
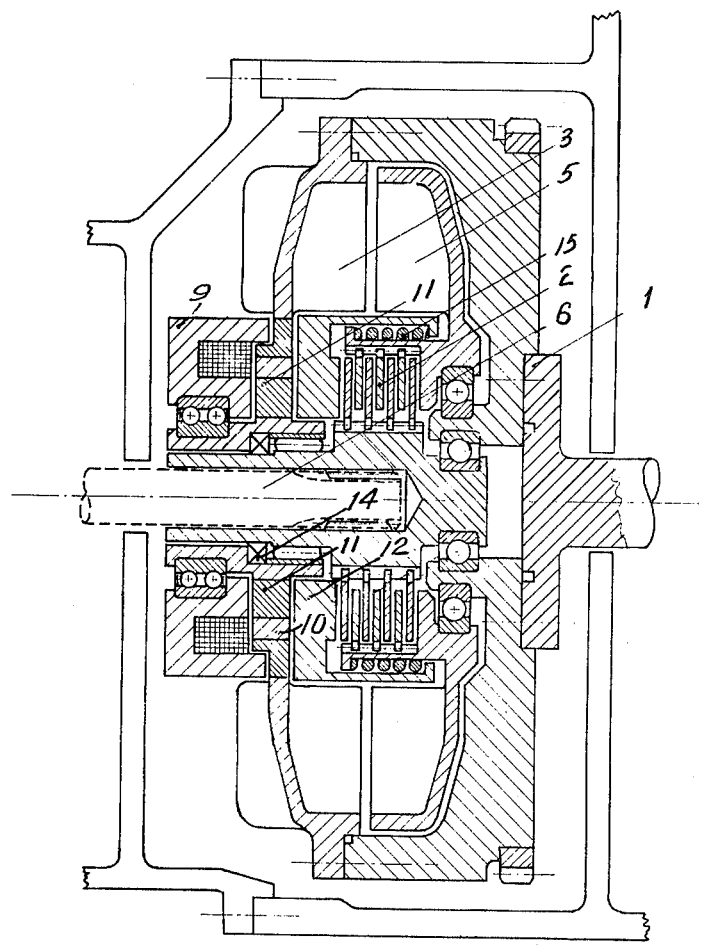
FIG. 5 shows an axial sectional view of a fluid coupling combined with a friction clutch between a turbine and a pump wheel of fluid coupling, according to a fifth embodiment of the invention.

With the fluid coupling according to FIG. 5, the friction clutch 2 is arranged between the turbine wheel 5 and the output shaft 6 and is closed in working condition by a pressure coil spring 15. The magnetic actuating device for the clutch 2 includes, as in the former embodiments, a solenoid 9, magnetically permeable conductors 11 and an armature 12 with the difference that, when the solenoid 9 is energized the clutch 2 will be opened against the action of the spring 15.

I claim:

1. In a fluid and friction coupling, a combination comprising an input shaft; an output shaft; a housing having an axis and including a pump wheel of the fluid coupling mounted on said input shaft; at least one friction clutch coaxially accommodated in the interior of said housing and having a component mounted in said housing for movement axially thereof between a first position in which said friction clutch is disengaged and said input shaft is free to rotate relative to said housing, and a second position in which said friction clutch is engaged and said housing is connected to said input shaft for shared rotation therewith, including an armature; and means located at the exterior of said housing and operative for selectively generating a magnetic field penetrating through said housing from said exterior to said interior thereof to act on said armature to thereby displace said component between said positions thereof.

2. In a fluid and friction coupling, a combination comprising a housing having an axis and an interior which is sealed with respect to the exterior of said housing and accommodates a body of fluid for the fluid coupling; an output shaft mounted in said housing for rotation; at least one friction clutch coaxially accommodated in the interior of said housing and having a component mounted in said housing for movement axially thereof between a first position in which said friction clutch is disengaged and a second position in which said friction clutch is engaged and including an armature; and means located at the exterior of said housing and operative for selectively generating a magnetic field penetrating through said housing from the exterior to the interior thereof to act on said armature to thereby displace said component between said positions thereof, including an electromagnet outside of said body of fluid at said exterior of said housing, means for sensing a parameter of said output shaft, means for comparing the sensed parameter with a predetermined parameter and means for energizing said electromagnet in dependence on the difference between said parameters.

3. A combination as defined in claim 2, wherein said sensed parameter is the speed of rotation of said output shaft.

4. In a fluid and friction coupling, a combination comprising a housing having an axis and an end wall at one axial end thereof; at least one friction clutch coaxially accommodated in the interior of said housing with a spacing from said end wall and having a component mounted in said housing for movement axially of the latter between a first position in which said friction clutch is disengaged and a second position in which said friction clutch is engaged; an armature rigidly mounted on said component for movement therewith and located at said end wall in said spacing; and means located at the exterior of said housing adjacent said end wall and operative for selectively generating a magnetic field penetrating through said end wall from the exterior to the interior of said housing to act on said armature and jointly displace the same with said component between said positions of the latter, whereas said friction clutch is located substantially outside the magnetic field generated by said generating means.

5. A combination as defined in claim 4, wherein said interior of said housing is sealed with respect to said exterior and accommodates a body of fluid for the fluid coupling; and wherein said generating means includes an electromagnet outside of said body of fluid at said exterior of said housing.

6. A combination as defined in claim 5; wherein said fluid coupling moves said body of fluid and further comprising means for guiding said moving fluid toward and past said friction clutch so as to cool the same.

7. A combination as defined in claim 5, wherein said electromagnet is annular and coaxial with said housing; and wherein said end wall is formed with at least one magnetically permeable portion located intermediate said electromagnet and said armature of said component so that said magnetic field penetrates through said magnetically permeable portion.

8. A combination as defined in claim 4, and further comprising an input shaft and an output shaft; wherein said housing is mounted on one of said shafts for rotation of the latter relative thereto when said component of said friction clutch is in said first position thereof, and for shared rotation therewith when said component of said friction clutch is displaced towards said second position thereof.

9. A combination as defined in claim 4, and further comprising an input shaft and an output shaft; wherein said housing is mounted on one of said shafts for rotation therewith; and wherein the other shaft is mounted in said housing for rotation relative thereto when said component of said friction clutch is in said first position thereof and for shared rotation therewith when said component of said friction clutch is in said second position thereof.

10. A combination as defined in claim 9, wherein said one shaft is said input shaft; further including a turbine wheel connected to said output shaft for rotation therewith; and wherein said housing includes a pump wheel of the fluid coupling.

11. A combination as defined in claim 4, wherein said generating means displaces said component towards said first position thereof; and further comprising means for displacing said component towards said second position thereof upon termination of the action of said generating means.

12. A combination as defined in claim 4, wherein said generating means displaces said component towards said second position thereof; and further comprising means for displacing said component towards said first position thereof upon termination of the action of said generating means.

* * * * *